United States Patent [19]

Fuehrer et al.

[11] 4,449,422
[45] May 22, 1984

[54] TRANSMISSION CENTER SUPPORT MOUNTING

[75] Inventors: Reece R. Fuehrer, Danville; Richard L. Hess, Columbus, both of Ind.

[73] Assignee: Genral Motors Corporation, Detroit, Mich.

[21] Appl. No.: 379,039

[22] Filed: May 17, 1982

[51] Int. Cl.³ .................. F16H 57/04; F16H 57/02; F02F 5/00; F16C 9/00
[52] U.S. Cl. .................. 74/606 R; 74/467; 277/26; 403/29
[58] Field of Search .............. 74/606 R, 467; 29/429, 29/226, 434, 467, 451, 525; 308/DIG. 14; 384/278; 403/29, 30, 28; 277/26; 184/6.12

[56] References Cited

U.S. PATENT DOCUMENTS

| | | | |
|---|---|---|---|
| 3,084,003 | 4/1963 | Matt et al. | 384/278 |
| 3,097,546 | 7/1963 | Kelbel et al. | 74/467 |
| 3,146,629 | 9/1964 | Schmitter | 74/467 |
| 3,653,118 | 4/1972 | Koivunen | 29/434 |
| 3,730,022 | 5/1973 | O'Malley | 74/759 |
| 3,765,519 | 10/1973 | Kell | 188/366 |
| 4,110,888 | 9/1978 | Mutou | 29/434 |
| 4,112,786 | 9/1978 | Thomas | 74/606 R |
| 4,152,957 | 5/1979 | Watanabe et al. | 74/606 R |
| 4,241,622 | 12/1980 | Kubo et al. | 74/606 R |
| 4,281,941 | 8/1981 | Rottenkolber | 403/29 |

Primary Examiner—Lawrence J. Staab
Assistant Examiner—Michael D. Bednarek
Attorney, Agent, or Firm—Saul Schwartz

[57] ABSTRACT

A fluid directing center support is mounted in a main bore of an automatic transmission by means of a pair of intermediate rings between the main bore and the center support. Each intermediate ring includes an elastomeric body portion which is compressed between the main bore and the center support and exerts on the latter balanced and radially directed forces which centralize the center support in the main bore. In addition, the coefficient of thermal expansion of the elastomeric body portion exceeds the coefficient thermal expansion of the transmission case by an amount sufficient to insure that the intermediate ring will always be maintained in compression regardless of the operating temperature of the transmission.

4 Claims, 5 Drawing Figures

TRANSMISSION CENTER SUPPORT MOUNTING

BACKGROUND OF THE INVENTION

1. Field of the Invention

This invention relates generally to power transmissions having fluid actuated ratio establishing devices and, in particular, to an improved mounting for fluid directing center supports in case portions of such transmissions.

2. Description of the Prior Art

Typical multiple speed automatic transmissions include cases or housings, pluralities of planetary gear sets supported in the housings, and further pluralities of fluid actuated clutches and brakes operatively associated with the various ring gears, sun gears, and planet carriers of the planetary gear sets to establish various ratio drives or power flow paths through the transmission. Often, these various clutches and brakes are arranged along a longitudinal axis of the transmission with each including an annular cylinder for pressurized fluid and an annular piston in each cylinder for applying pressure to friction discs to effect clutching or braking. In order to structurally support fixed or rotating elements of those clutches and brakes located toward the middle of the transmission and to direct pressurized fluid to corresponding ones of the annular cylinder, it has been customary to employ structural members known as center supports. Such members usually are bolted in place in the transmission, provide bearing surfaces for rotating elements, and include fluid passages extending from the various annular cylinders to ports on the transmission cases to which pressurized fluid can be directed by valve bodies. A transmission center support mounting according to this invention represents an improvement whereby center supports are mounted in transmission cases without bolts.

SUMMARY OF THE INVENTION

The primary feature, then, of this invention is that it provides a new and improved center support mounting in a power transmission having fluid actuated ratio establishing devices. Another feature of this invention is that it provides a new and improved transmission center support mounting wherein the center support is centralized in a bore in the transmission case throughout the operating temperature range of the transmission while also being restrained against rotation in the bore. Still another feature of this invention resides in the provision in the new and improved transmission center support mounting of an intermediate member between the center support and the case resiliently biasing the center support to a centralized location in the bore of the case and thermally expandable at a rate exceeding that of the case so that at any elevated operating temperature of the transmission the intermediate member continues to exert resilient centralizing forces on the center support. A still further feature of this invention resides in the provision in the new and improved transmission center support mounting of intermediate members in the form of elastomeric rings between the center support and the case which rings resiliently centralize the center support and experience greater thermal expansion than the metal case and in the provision of jumper tubes between fluid ports in the case and fluid passages in center support, the jumper tubes functioning to sealingly bridge the gap across the interface between the center support and the case while simultaneously preventing rotation of the center support in the case.

These and other features of this invention will be readily apparent from the following specification and from the drawings wherein.

Figure 1:
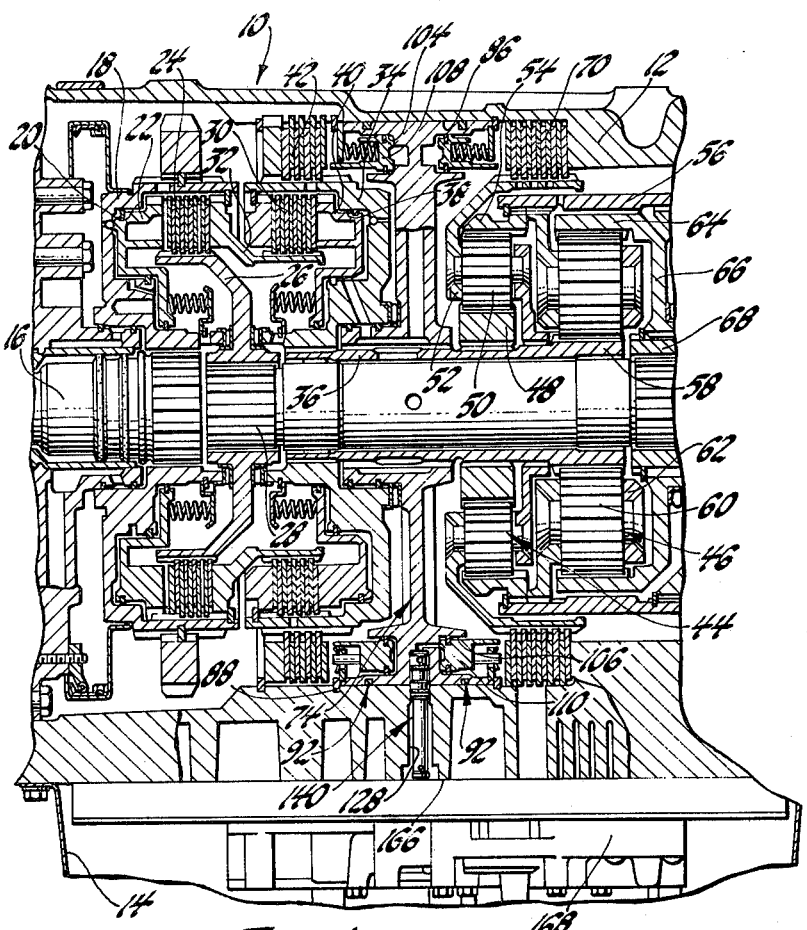
FIG. 1 is a sectional view of a portion of a transmission having fluid actuated ratio establishing devices and a center support mounting according to this invention.

Referring now to FIG. 1 of the drawings and describing the environment in which the center support mounting according to this invention finds utility, a transmission designated generally 10 includes a case 12 adapted for rigid attachment to an engine block or like support and an oil sump 14 bolted to the bottom of the case 12. The case is metal, as for example an aluminum die casting, and supports therewithin a plurality of gear sets, clutches, and brakes now briefly described. An input shaft 16 is connected in conventional fashion to a torque converter turbine or the like, not shown, and provides input torque to the transmission gearing. The input shaft has a first rotating clutch drum 18 splined to the inboard end thereof which clutch drum defines an annular cylinder 20 in which is slidably disposed an annular piston 22. A first clutch pack 24 of interengaging friction discs is disposed between the first drum 18 and a hub 26 and functions to connect the first drum to the hub when the piston 22 is energized by pressurized fluid in cylinder 20 to compress the discs. The hub 26 is rigidly connected to one end of an intermediate shaft 28 colinear with the input shaft 16.

With continued reference to FIG. 1, a second clutch pack 30 of interengaging friction discs is located between an extension 32 of the first clutch drum 18 and a second clutch drum 34 rigidly mounted on one end of a sleeve shaft 36 disposed around and rotatably supported on the intermediate shaft 28. An annular cylinder 38 is defined in the second clutch drum 34 and slidably supports an annular piston 40 operative upon introduction of pressurized fluid to the cylinder 38 to compress the discs of clutch pack 30 in known fashion to rigidly connect the first and second clutch drums 18 and 34. A third clutch pack 42 of interengaging friction discs is disposed between the second rotatable clutch drum 34 and the case 12 in known fashion and functions as more fully described hereinafter as a brake to rigidly connect the drum 34 to the case.

The transmission 10 further includes a pair of planetary gear sets 44 and 46 which are representative of other well known planetary gear combinations. Gear set 44 includes a sun gear 48 rigidly attached to sleeve shaft 36, a plurality of pinions 50 meshing with the sun gear 48 and rotatably supported on a carrier 52, and a ring gear 54 connected to an output drum 56. The gear set 46 includes a sun gear 58 also rigidly attached to the sleeve shaft 36, a plurality of pinions 60 meshingly engaging the sun gear 58 and rotatably supported on a carrier 62 rigidly connected to the output drum 56, and a ring gear 64 meshing with the pinions 60 and rigidly attached to a hub 66. The hub 66 is connected by splines to a sleeve 68 which, in turn, is connected by another set of splines to the intermediate shaft 28. Finally, a fourth clutch pack 70 of interengaging friction discs is disposed between the case 12 and the carrier 52 of the planetary gear set 44 and functions as described hereinafter as a brake to rigidly connect the carrier 52 to the case.

It will, of course, be apparent that the clutches, brakes and gearing thus described are operative to establish a plurality of torque paths or ratio drives through the transmission. For example, if only clutch pack 24 is compressed by piston 22, torque is transmitted from the input shaft 16 through the clutch pack 24, the hub 26, the intermediate shaft 28 and the sleeve 68 to an output member of the transmission, not shown. Alternatively, if the first and second clutch packs 24 and 30 are compressed by pistons 22 and 40, respectively, torque is transmitted from the input shaft 16, through the two clutch packs 24 and 30, to both the intermediate shaft 28 and sleeve shaft 36 wherefrom torque is transmitted through both of the planetary gear sets 44 and 46 to the output drum 56. Still another torque path or ratio drive can be defined by compression of first clutch pack 24 and third clutch pack 42, this torque path being from the input shaft 16, through the clutch pack 24, to the intermediate shaft 28, and then from the intermediate shaft through the sleeve 68, the planetary gear set 46 and the output drum 56 because the sleeve shaft 36 is braked or held fixed by the clutch pack 42. Achievement of these and other possible ratio drives depend upon selective compression of various ones of the four clutch packs described which compression depends upon selective distribution of pressurized hydraulic fluid to corresponding ones of the cylinders associated with the pistons compressing the clutch packs.

Figure 2:
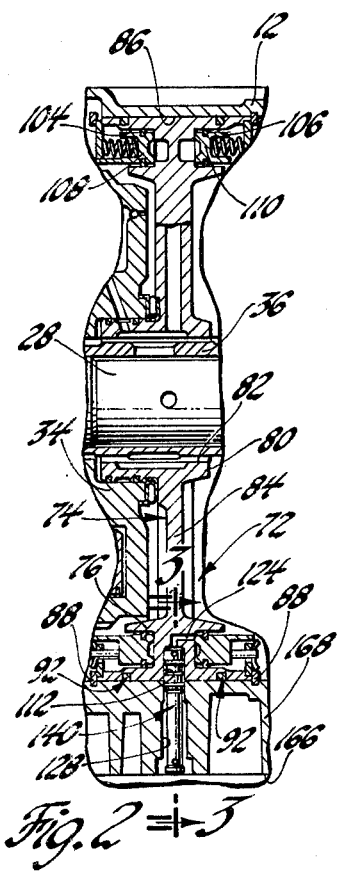
FIG. 2 is a view of a portion of FIG. 1 showing only the center support mounting according to this invention.

Referring, now, to FIGS. 1 and 2, with the clutch packs and gear sets arranged as illustrated it is necessary that structural support be provided generally toward the middle of the transmission. Such support is most conveniently provided by a new and improved center support mounting according to this invention and designated generally 72. The center support mounting 72 includes a cylindrical center support member 74 having a relatively thick outer annular flange 76 defining an outer cylindrical surface 78, an inner flange 80 defining an internal bore 82, and a disc-like web 84 interconnecting the inner and outer flanges 80 and 76. The outer cylindrical surface 78 of the support member 74 is received within a relatively large cylindrical bore 86 in the case 12 with the bore 82 providing rotatable bearing support for the sleeve shaft 36 and with the inner flange 80 providing bearing support for the second rotatable clutch drum 34. Axial movement of the center support member 74 is prevented by a pair of fore and aft retaining rings 88 mounted in grooves 89 on opposite sides of the center support member.

Figure 4:
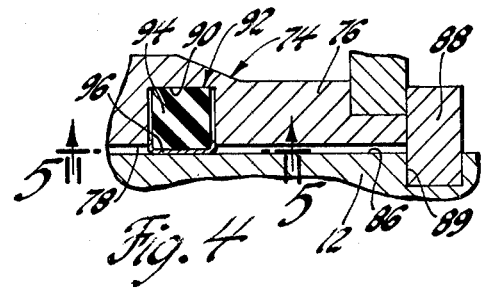
FIG. 4 is an enlarged view of a portion of FIG. 2.
Figure 5:
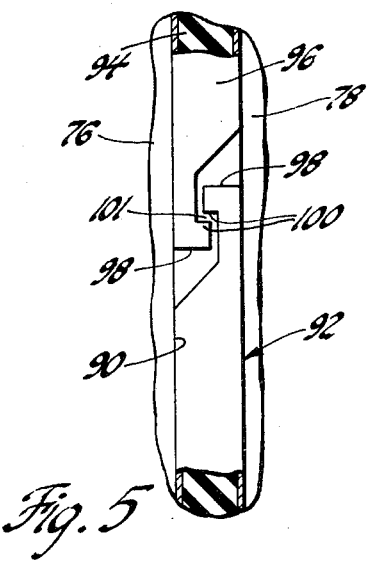
FIG. 5 is a view taken generally along the plane indicated by lines 5—5 in FIG. 4.

With reference particularly now to FIGS. 2 and 4, a pair of annular grooves 90 are formed in the outer flange 76 of the center support member 74 and open radially outward toward the bore 86. The grooves are disposed generally at opposite longitudinal ends of the outer flange and contain respective ones of a pair of intermediate members or centralizing rings 92. The rings 92 are identical and each includes an elastomeric body 94 and a metal band 96 bonded to the elastomeric body. For assembly purposes, as described hereinafter, each ring 92 is split generally at a parting line 98, FIG. 5, and the ends are overlapped. The portions of each ring 92 back from each of the parting lines 98 are recessed to define hook portions 100 engageable to prevent separation of the parted ends of the ring. The cross sectional configuration of each of the rings 92 corresponds generally to the cross sectional configurations of the annular grooves 90 in the outer flange 76 of the center support member 74. However, the height or radial thickness of each of the rings 92 exceeds the depth of grooves 90 so that, in an unstressed or uncompressed condition, a portion of each ring 92 projects beyond the outer cylindrical surface 78.

Describing now the installation and operation of the centralizing rings 92, prior to installation of the center support member 74 in the bore 86 of the case 12, respective ones of the pair of rings 92 are expanded and fitted around the outer cylindrical surface 78. Each of the centralizing rings 92 is fitted into a corresponding one of the grooves 90 in the center support member 74 with the bands 96 exposed while the ends of the rings are overlapped and interlocked by the hook portions 100 to prevent inadvertent separation of the rings from the center support member. Then, in its proper assembly sequence relative to the other transmission components, the center support member 74 is fitted into the bore 86 of the case.

The fitting sequence involves, first, seating each of the centralizing rings 92 on the bottom of its respective groove 90 around the entire circumference of the center support member 74. The hook portions 100, while preventing outward separation of the ends of each centralizing ring, permit relative inward separation or lost motion so that with the rings 92 fully seated in the grooves, a slight gap 101 may exist between the hook portions 100. With the centralizing rings thus seated in the grooves but unstressed, portions of the rings extend far enough radially outward of the cylindrical surface 78 such that the bands 96 lie in circles having diameters exceeding the diameter of bore 86 in the case 12. Accordingly, the second step in the fitting sequence involves compression of the elastomeric bodies 94 of the rings 92 until the bands 96 are flush with the outer cylindrical surface 78 of center support member whereupon the latter is slid into and along the bore 86 to its assembled position between the retaining ring grooves 89. Such compression may, of course, be effected by appropriate devices similar to ordinary piston ring compressors or, alternatively, by a chamfer on the case 12 around the bore 86 which operates to gradually and evenly compress the rings 92 prior to entry into the bore. In either case, once the rings 92 enter the bore, each resiliently expands until the bands 96 engage the internal surface of the bore. The bands 96 function as barriers between the elastomeric bodies 94 and the bore 86 to prevent damage to the bodies during sliding movement of the center support member to its assembled position.

Since, in its unstressed or uncompressed condition, the outside diameter of each of the rings 92 exceeds the diameter of the bore 86, when the center support member 74 is in the bore the elastomeric bodies 94 are maintained compressed between the bore 86 and the bases or bottoms of grooves 90. Thus, radially oriented forces of magnitudes proportional to the degree of compression of the bodies 94 are exerted on the center support member 74 around its entire circumference which forces are balanced and operate to centralize or align the center support member on the longitudinal axis of the transmission.

The elastomeric material from which the bodies 94 are fabricated has a coefficient thermal expansion substantially exceeding the coefficients of thermal expansion of the material from which the case 12 and/or the center support member 74 are fabricated. Accordingly, as the temperature of the entire transmission assembly rises from ambient to an elevated temperature corresponding to normal operation of the transmission, expansion of the elastomeric bodies 94 exceeds the expansion of bore 86 in the case so that the elastomeric bodies are always maintained in substantial compression between the center support member 74 and the bore 86. The center support member is thereby centralized in the bore by the rings 92 regardless of the operating temperature of the transmission.

Figure 3:
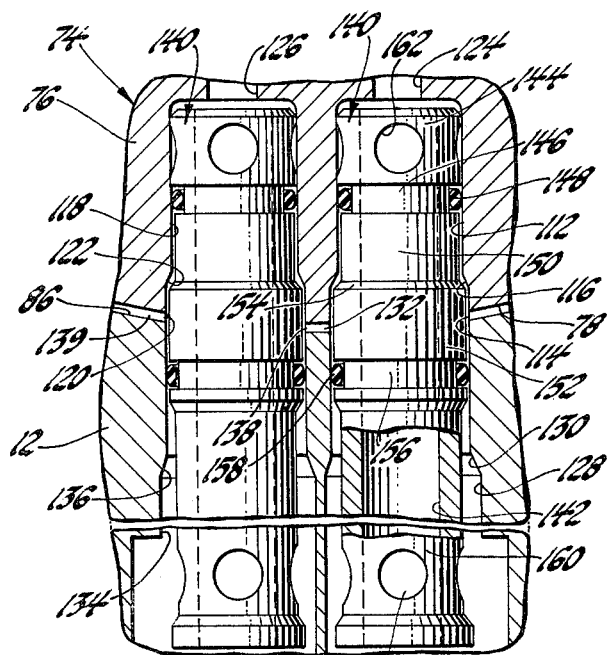
FIG. 3 is an enlarged sectional view taken generally along the plane indicated by lines 3—3 in FIG. 2.

With reference, now, to FIGS. 1, 2 and 3, the center support mounting 72, in addition to functioning as a bearing support for the rotating clutch drum 34 as described hereinbefore, also functions as a structure on which to mount non-rotating pistons for compressing third and fourth clutch packs 42 and 70. More particularly, an annular cylinder 104 facing third clutch pack 42 is defined in the outer flange 76 of the center support member 74. A similar annular cylinder 106 is defined on the opposite side of annular flange 76 facing the fourth clutch pack 70. An annular piston 108 is slidably disposed in cylinder 104 and functions to compress the discs forming third clutch pack 42 in known manner upon introduction of pressurized hydraulic fluid to the cylinder 104 behind the piston. Likewise, an annular piston 110 is slidably disposed in the cylinder 106 and functions to compress the discs forming fourth clutch pack 70 in known manner upon introduction of pressurized hydraulic fluid to the cylinder 106 behind the piston.

Referring particularly to FIGS. 2 and 3, a generally radially directed cylindrical oil gallery 112 in the center support member 74 intersects the outer cylindrical surface 78 at 114 and includes a frustoconical shoulder 116 between large and small diameter portions of the gallery. A second cylindrical oil gallery 118 in the center support member 74 intersects the outer cylindrical surface 78 at 120 and also includes a frustoconical shoulder 122 between large and small diameter portions of the gallery. A passage 124 extends from the gallery 112 to the annular cylinder 106 behind piston 110 and a passage 126 extends from the gallery 118 to the annular cylinder 104 behind piston 108. A stepped cylindrical bore 128 in the case 12 has a tapered shoulder 130 between small and large diameter portions of the bore and intersects the bore 86 of the case at a supply port 132. Similarly, a stepped bore 134 in the case 12 has a shoulder 136 between small and large diameter portions of the bore and intersects the bore 86 in the case at a supply port 138. In the assembled position of the center support member 74, the oil galleries 112 and 118 register with the ports 132 and 138, respectively, the ports being separated from the galleries by a variable distance or gap 139 between the outer cylindrical surface 78 of the center support member and the bore 86 in the case.

With particular reference to FIG. 3, respective ones of a pair of identical jumper tubes 140 are disposed in corresponding ones of the aligned galleries 112 and 118 and ports 132 and 138, respectively. While only two jumper tubes are illustrated, it is understood that the center support mounting according to this invention contemplates jumper tubes corresponding in number to the number of fluid passages formed in the center support member. Describing only one of the tubes 140, it is generally cylindrical in configuration and includes a central passage 142 extending the entire length of the tube. A cylindrical pilot portion 144 of diameter generally corresponding to the small diameter portion of gallery 112 is disposed at one end of the tube 140 and extends back to a seal ring groove 146 in which is disposed an elastomeric seal member or O-ring 148. Below the seal ring groove 146, the jumper tube 140 has a cylindrical intermediate portion 150 of diameter slightly less than the small diameter portion of gallery 112. The jumper tube 140 further includes an enlarged diameter portion 152 connected to the intermediate portion by a shoulder 154. The enlarged diameter portion 152 includes a seal ring groove 156 in which is disposed an elastomeric seal or O-ring 158. Below the enlarged diameter portion 152, the jumper tube 140 includes a slightly smaller diameter tail portion 160. Completing the jumper tube structure, a plurality of apertures 162 in the pilot portion 144 provide communication between the gallery 112 and the passage 124 and the interior passage 142 in the jumper tube. Similarly, a plurality of apertures 164 in the tail portion 160 of the jumper tube provide communication between the interior passage 142 and the bore 128 in the case 12.

With reference to FIGS. 1, 2 and 3 and describing the assembly and function of one of the jumper tubes 140, the bore 128 in the case extends from the bore 86 in the case to a flat bottom surface 166 of the case. Thus, when the center support member 74 is assembled in the bore 86 as described hereinbefore, with the galleries 112 and 118 in the center support member registering with the ports 132 and 138 on the case, the jumper tube 140 may be inserted through the surface 166, into the bore 128 and on into gallery 112 in the center support member. During this procedure, the tube 140 operates as a pilot to assure accurate alignment between the gallery 112 and the bore 128 for proper installation and seating of the seal ring 148.

More particularly, as the jumper tube 140 passes from the bore 128 in the case into the gallery 112 in the center support member, the pilot portion enters the largest diameter portion of the gallery 112 first and engages the shoulder 116. As the jumper tube is inserted further into the bore, the conical taper on the shoulder 116 cooperates with the pilot portion 144 of the jumper tube and aligns the gallery 112 directly over the bore 128. When such alignment is achieved, the pilot portion 144 enters the small diameter portion of the gallery 112, bringing the seal ring 148 into contact with the shoulder 116. Final projection of the jumper tube 140 into the gallery 112 causes the seal ring 148 to be compressed by the shoulder 116 and fed directly into the small diameter portion of the gallery without damage. In the fully assembled position of the jumper tube 140 then, the seal ring 148 is disposed on one side of the gap 139 between the cylindrical surface 78 on the center support member and the bore 86 in the case to prevent fluid escape from center support member. Similarly, the seal ring 158 is disposed in the case 12 on the opposite side of the gap 139 to prevent escape of fluid from the case. Finally, after the jumper tubes are inserted as described, a valve body assembly 168, FIG. 1, is sealingly bolted or otherwise conventionally attached to the case 12 of the transmission at the flat bottom surface 166. The valve body assembly functions in known manner to selectively direct pressurized hydraulic fluid to the bores 128 and 134 in the case for selective actuation of the annular pistons 108 and 110. Simultaneously, the jumper tubes provide rigid resistance to rotation of the center support member 74 in the bore 86 of the case under the influence of torque generated during compression of respective ones of the third and fourth clutch packs 42 and 70.

The embodiments of the invention in which an exclusive property or privilege is claimed are defined as follows:

1. In a transmission having a normal elevated operating temperature and including a case having a main bore defining an internal cylindrical surface, a center support disposed in said main bore with a cylindrical outer surface thereof juxtaposed with said internal cylindrical surface, an oil supply port in said case, intersecting said internal cylindrical surface, and an oil gallery in said center support intersecting said outer surface generally in register with said oil supply port, the improvement comprising, resilient intermediate means disposed in compression between said center support member and said case operative to exert on said center support balanced and radially directed forces centralizing said center support on a longitudinal axis of said transmission, said resilient intermediate means being fabricated from a material having a coefficient of thermal expansion sufficiently exceeding at least one of the coefficients of thermal expansion of said case and said center support to maintain said intermediate means in compression and said center support centralized throughout the operating temperature range of said transmission.

2. In a transmission having a normal elevated operating temperature and including a case having a main bore defining an internal cylindrical surface, a center support disposed in said main bore with a cylindrical outer surface thereof juxtaposed with said internal cylindrical surface, an oil supply port in said case intersecting said internal cylindrical surface, and an oil gallery in said center support intersecting said outer surface generally in register with said oil supply port, the improvement comprising, resilient intermediate means disposed around said center support between the latter and said case operative to exert on said center support balanced and radially directed forces centralizing said center support on a longitudinal axis of said transmission, said resilient intermediate means being fabricated from a material having a coefficient of thermal expansion sufficiently exceeding at least one of the coefficients of thermal expansion of said case and said center support to maintain said intermediate means in compression and said center support centralized throughout the operating temperature range of said transmission, and jumper tube means between said oil gallery and said oil supply port operative to sealingly convey fluid across the interface between said internal cylindrical surface of said bore and said outer surface of said center support while preventing rotation of said center support in said case.

3. In a transmission having a normal operating temperature range and operative to establish a ratio drive between an input and an output of said transmission and including a case, a main bore in said case defining an internal cylindrical surface, a center support disposed in said main bore having an outer cylindrical surface juxtaposed with said internal cylindrical surface, an oil supply port in said case intersecting said internal cylindrical surface, and an oil gallery in said center support intersecting said outer cylindrical surface generally in register with said oil supply port, the improvement comprising, means defining an annular groove in one of said case and said center support at the corresponding one of said internal cylindrical surface and said outer cylindrical surface, an intermediate ring including a resilient elastomeric body portion disposed in said annular groove in compression between said case and said center support around substantially the entire periphery of said center support so that balanced and radially directed forces are exerted on said center support operative to centralize the latter in said main bore on a longitudinal axis of said transmission, said elastomeric body portion having a coefficient of thermal expansion sufficiently exceeding at least one of the coefficients of thermal expansion of said case and said center support to maintain said intermediate ring in compression and said center support centralized throughout the operating temperature range of said transmission, a jumper tube projecting from said supply port into said oil gallery operative to prevent rotation of said center support relative to said case in said main bore, and seal means between said jumper tube and each of said case and said center support for preventing escape of fluid around said jumper tube so that said jumper tube is operative to convey fluid across the interface between said internal cylindrical surface and said outer cylindrical surface.

4. In a transmission having a normal operating temperature range and operative to establish a ratio drive between an input and an output of said transmission and including a case, a main bore in said case defining an internal cylindrical surface, a center support disposed in said main bore having an outer cylindrical surface juxtaposed with said internal cylindrical surface, an oil supply port in said case intersecting said internal cylindrical surface, and an oil gallery in said center support intersecting said outer cylindrical surface generally in register with said oil supply port, the improvement comprising, means defining an annular groove in said center support at said outer cylindrical surface, an intermediate ring including a resilient elastomeric body portion and a metal band bonded to said elastomeric body portion disposed in compression in said annular groove with said band engaging said internal cylindrical surface and said elastomeric body portion engaging a bottom of said groove around substantially the entire periphery of said center support so that balanced and radially directed forces are exerted on said center support operative to centralize the latter in said main bore on a longitudinal axis of said transmission, said elastomeric body portion having a coefficient of thermal expansion sufficiently exceeding the coefficient of thermal expansion of said case to maintain said intermediate ring in compression and said center support centralized throughout the operating temperature range of said transmission, means defining in said oil gallery a stepped bore having a large diameter portion intersecting said outer cylindrical surface and a smaller and concentric pilot diameter portion connected to said large diameter portion by a conical shoulder, means defining in said oil supply port a cylindrical bore registering with said stepped bore and corresponding in diameter to said large diameter portion, a jumper tube projecting from said cylindrical bore into said stepped bore to prevent rotation of said center support relative to said case in said main bore including a cylindrical pilot head disposed in said pilot diameter portion, a first seal ring between said pilot diameter portion and said jumper tube operative to prevent fluid flow around the outside of said jumper tube, and a second seal ring between said jumper tube and said cylindrical bore operative to prevent fluid flow around said jumper tube so that said jumper tube is operative to convey fluid across the interface between said internal cylindrical surface and said outer cylindrical surface.

* * * * *